(No Model.)  2 Sheets—Sheet 1.
E. W. SCOTT.
BICYCLE.
No. 496,007.  Patented Apr. 25, 1893.
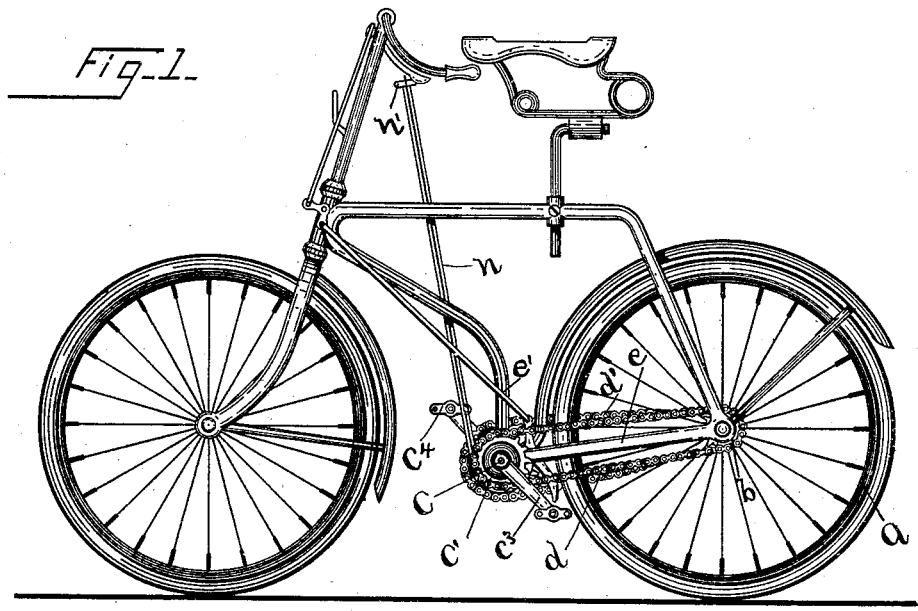
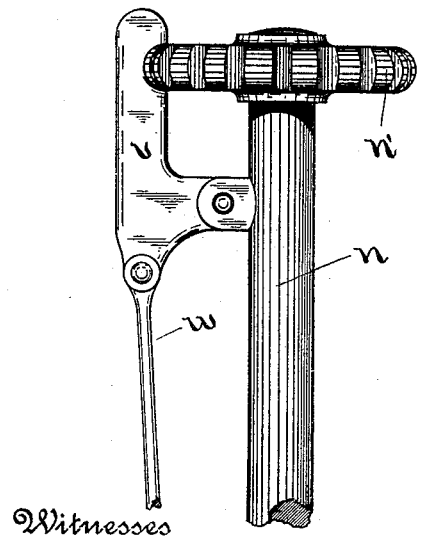
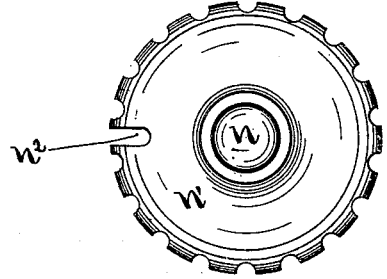
Witnesses
Alonzo M. Luther.
Allen Tenny.
Inventor
Erastus W. Scott.
By his Attorney
Frank H. Allen, (No Model.) 2 Sheets—Sheet 2.

E. W. SCOTT.
BICYCLE.

No. 496,007. Patented Apr. 25, 1893.

Witnesses
Alonzo M. Luther.
Allen Tenny.

Inventor
Erastus W. Scott
By his Attorney
Frank H. Allen.

THE NORRIS PETERS CO., PHOTO-LITHO., WASHINGTON, D. C.

UNITED STATES PATENT OFFICE.

ERASTUS W. SCOTT, OF DANIELSONVILLE, CONNECTICUT.

BICYCLE.

SPECIFICATION forming part of Letters Patent No. 496,007, dated April 25, 1893.

Application filed February 23, 1892. Serial No. 422,417. (No model.)

*To all whom it may concern:*

Be it known that I, ERASTUS W. SCOTT, a citizen of the United States, residing at Danielsonville, in the county of Windham and State of Connecticut, have invented certain new and useful Improvements in Bicycles, which improvements are fully set forth and described in the following specification, reference being had to the accompanying two sheets of drawings, in which—

Figure 4:
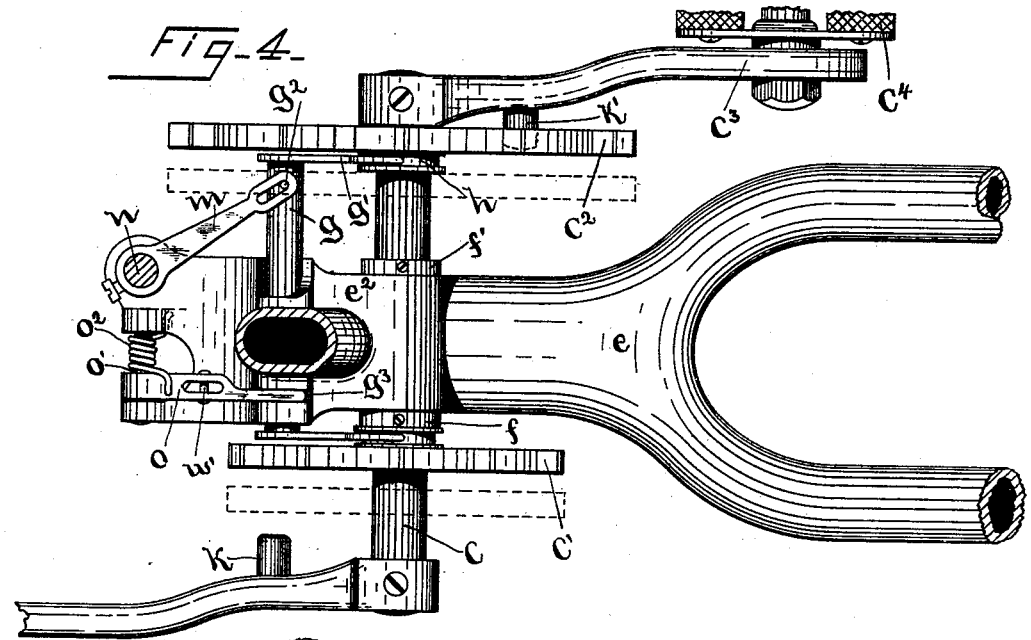
Figure 5:
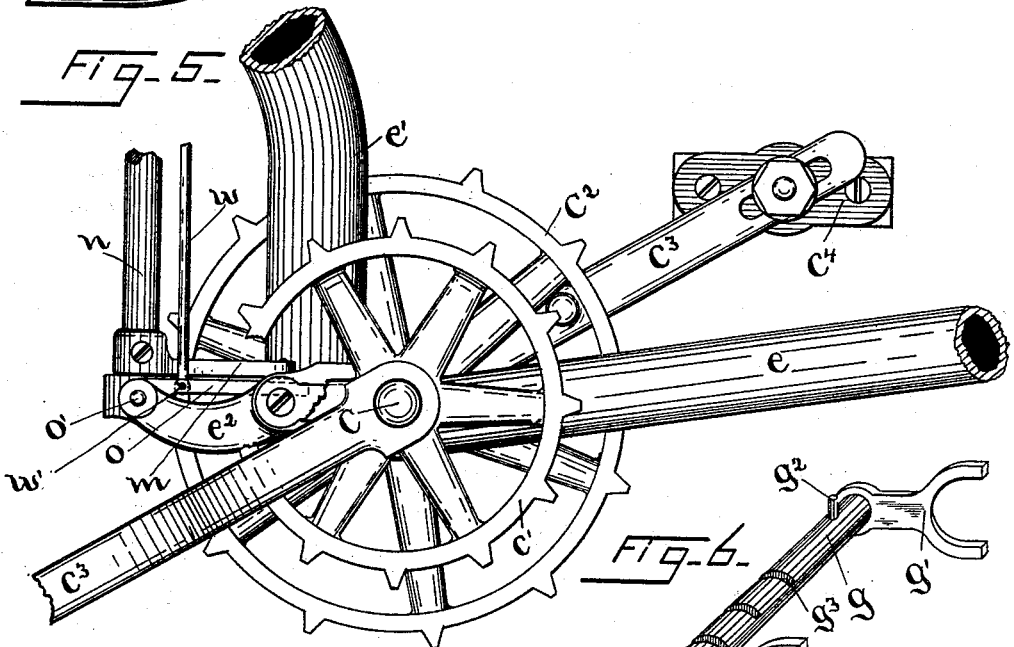
Figure 6:
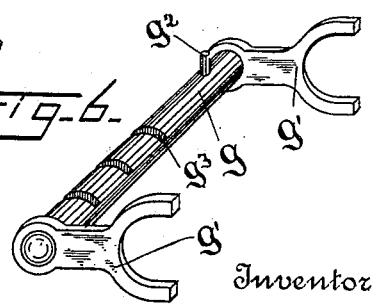

Figure 1 is a side elevation of a bicycle embodying my improvements. Figs. 2 and 3 are respectively top and side views of the hand wheel and connected parts used in controlling my newly invented mechanism. Fig. 4 is an enlarged plan view of the crank-shaft and portions of its supporting frame and Fig. 5 is a side elevation of the same. Fig. 6 is a detached, perspective view, of a shift-bar and forks, by means of which certain sprockets on the crank-shaft may be shunted from side to side as, and for the purposes hereinafter explained.

This invention relates to that class of 'cycles in which driving mechanism is employed consisting of a chain connecting a sprocket-wheel on an independent crank-shaft with a similar sprocket-wheel secured to the axial shaft of one of the 'cycle wheels and my immediate object is to provide an improved system of driving mechanism, of simple construction, by means of which an increase of either speed or power may be instantly brought into use by the rider of the 'cycle, whenever necessary or desirable. Such an improvement is of especial value in hilly districts, or on sandy roads, where an increase of motive power is to be desired rather than great speed. When such conditions are met, the rider of my improved 'cycle may instantly (and without dismounting) bring into service high power mechanism which will enable him to climb with comparative ease hills of ordinary road grade. On the other hand, when wheeling on level roads where but little power is required to keep the 'cycle in motion, my high speed mechanism may instantly be brought into service and an increase of mileage traversed without any unusual expenditure of effort. My new construction is also such that the crank or driving shaft may be instantly thrown out of clutch with the sprocket mechanism when coasting, or when, for any other reason, it is desired to stop the rotation of the pedals. All of these advantanges are made possible through the addition of a few simple machine elements which I will proceed to describe.

Fig. 1 illustrates a complete bicycle of the commonly known "safety" pattern having a front steering wheel, a rear driven wheel $a$ and a frame work connecting said wheels in the usual manner. These parts are here shown precisely as in 'cycles as commonly manufactured and need no detailed explanation. Ordinarily a single sprocket wheel $b$ is secured to the shaft of the rear wheel $a$ and a similar sprocket $c'$ is secured to the crank-shaft $c$ located between the wheels of the 'cycle within easy reach of the rider's feet. These sprocket-wheels ($b$ and $c'$) are connected by a chain $d$ by means of which power and motion are transmitted from the crank-shaft to the rear wheel.

In my newly improved 'cycle I provide two sprocket-wheels $b$ of about the same diameter on the shaft of wheel $a$, and on the crank-shaft $c$ I have loosely fitted sprocket-wheels $c'-c^2$ of different diameters and have connected the last named sprockets with those of the rear wheel by chains $d$ and $d'$. The sprockets $c'$ and $c^2$ may be moved laterally a limited distance on the crank-shaft $c$.

The letter $e$ denotes a bifurcated frame that extends rearward and straddles the rear wheel $a$, and $e'$ denotes that portion of the 'cycle frame that extends upward and forward to the neck of the machine. The frames $e-e'$ are connected by a bracket $e^2$ that is bored to receive the crank-shaft $c$ which latter revolves freely in the journal bearing thus provided but is held against longitudinal movement by collars $f-f'$ secured to the shaft at each end of said bearing (see Fig. 4). Secured to each end of shaft $c$ is an ordinary crank-arm $c^3$ having at its free end a pedal $c^4$. The bracket $e^2$ is bored just forward of shaft $c$, to receive a longitudinally movable rod $g$ that bears at each end a forked plate $g'$. These forks enter annular grooves $h$ in hubs formed on the inner ends of the sprockets $c'-c^2$ and serve both to keep said sprockets a given distance apart at all times and to shunt said sprockets along shaft $c$. On the inner sides of the crank-arms $c^3$ are projecting studs $k$—$k'$. The sprockets $c'$—$c^2$ are formed with spokes. When the sprockets are shunted in one direction stud $k'$ enters one of the openings between the spokes of sprocket $c^2$, as plainly illustrated in Fig. 4 of the drawings, thus practically gearing up the driving mechanism of the 'cycle and increasing its speed with a given number of revolutions of shaft $c$. When, however, the sprockets $c'$—$c^2$ are shunted along said shaft in the opposite direction, the former ($c'$) is brought into locking engagement with the stud $k$ and the speed of the 'cycle is lessened or (what is in effect the same result) provision is thus made for an increase of propelling power with a given number of revolutions of shaft $c$. Said shaft is of such length that both of the sprockets may be moved out of engagement with their respective studs, in which neutral position they may run idly on shaft $c$, receiving motion at such times from the revolution of the rear 'cycle wheel $a$.

To shunt the bar $g$ and the connected sprockets $c'$—$c^2$ I provide an arm $m$ secured to a rod $n$ whose lower end is journaled in an extension of bracket $e^2$. The free end of arm $m$ is slotted and straddles a pin $g^2$ on bar $g$. When rod $n$ is rocked slightly in its bearings the arm $m$ causes bar $g$ to slide longitudinally, carrying with it the sprockets $c'$—$c^2$. Rod $n$ extends upward to a point near the steering-head of the machine and terminates with an operating handle here shown as a hand wheel $n'$ which may be grasped to rock the rod.

I have provided a simple lock or latch to prevent the accidental displacement of bar $g$, said lock consisting of an arm $o$ hung on a short shaft $o'$ journaled in the bracket $e^2$. A spring $o^2$ encircles the shaft $o'$ having its ends disposed in such manner that the free end of arm $o$ is forced, normally, downward into engagement with certain transverse slots $g^3$ in the bar $g$, said slots being three in number and so located that one of them is coincident with the latch $o$ when the sprockets $c'$—$c^2$ are in lock with their respective studs and also when in their neutral positions. The latch $o$ is withdrawn from slots $g^3$ by means of a rod $w$ whose lower end is connected by a pivot $w'$ with said latch and whose upper end is hinged to an angle-lever $v$ located adjacent to the hand wheel $n'$ already described and preferably arranged to lie partly within a radial slot $n^2$ in said hand-wheel. When the hand-wheel is grasped by the rider the angle-lever $v$ is forced into slot $n^2$ thus drawing the connecting rod $w$ and latch $o$ slightly upward. A slight rocking of rod $n$ in the proper direction, then serves to shunt the bar $g$ and its connected sprockets to bring about the desired change of speed in the propelling mechanism.

My described improvements add but little to the weight and cost of a 'cycle yet they add materially to the comfort and convenience of the rider.

Having described my invention, I claim—

In combination in a cycle, duplicate driving mechanism of the form described, a notched bar $g$ with forked plates connecting the driving sprockets of said mechanism, a spring actuated latch $o$ held normally in engagement with one of the notches of the bar $g$ and mechanism as described for withdrawing said latch from said notch for the purpose specified.

ERASTUS W. SCOTT.

Witnesses:
FRANK H. ALLEN,
ALONZO M. LUTHER.